United States Patent [19]
Mattimoe et al.

[11] 3,900,673
[45] Aug. 19, 1975

[54] AUTOMOTIVE GLAZING STRUCTURE

[75] Inventors: Paul T. Mattimoe, Toledo; Theodore J. Motter, Genoa; John J. Hofmann, Toledo, all of Ohio; Siegfried H. Herliczek, Ottawa Lake, Mich.

[73] Assignee: Libbey-Owens-Ford Company, Toledo, Ohio

[22] Filed: Sept. 13, 1974

[21] Appl. No.: 505,830

Related U.S. Application Data

[63] Continuation-in-part of Ser. No. 284,137, Aug. 28, 1972, abandoned.

[52] U.S. Cl. .................. 428/339; 156/99; 156/106; 428/421; 428/428; 428/409
[51] Int. Cl. ...................... B32b 17/06; B32b 27/40
[58] Field of Search .......... 161/190, 194, 199, 231, 161/257, 404, 2, 183, 1, 189, 206, 402, 204, 165; 156/99, 106

[56] References Cited
UNITED STATES PATENTS

| | | | |
|---|---|---|---|
| 2,184,876 | 12/1939 | Sherts | 161/199 |
| 3,427,770 | 2/1969 | Kunert et al. | 53/209 |
| 3,666,614 | 5/1972 | Snedeker et al. | 161/183 |
| 3,708,386 | 1/1973 | Alexander et al. | 161/165 |

*Primary Examiner*—George F. Lesmes
*Assistant Examiner*—Lorraine T. Kendell
*Attorney, Agent, or Firm*—Collins, Oberlin & Darr

[57] ABSTRACT

An automobile windshield that incorporates, as part of its laminated structure, a protective laceration inhibiting cover or shield, bonded to its inboard glass surface and combining a penetration resisting multi-layer body with an exposed surface that is resistant to weathering and wear.

10 Claims, 4 Drawing Figures

PATENTED AUG 1 9 1975　　　　　　　　　　　　3,900,673
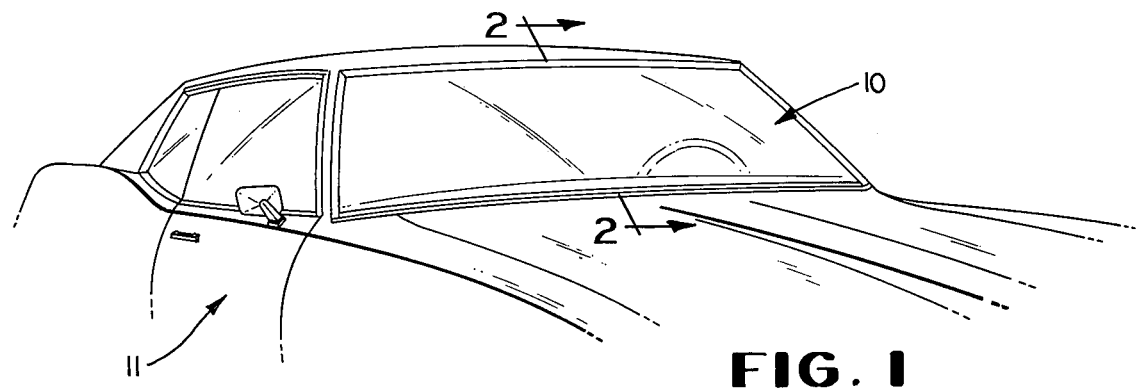
FIG. 1
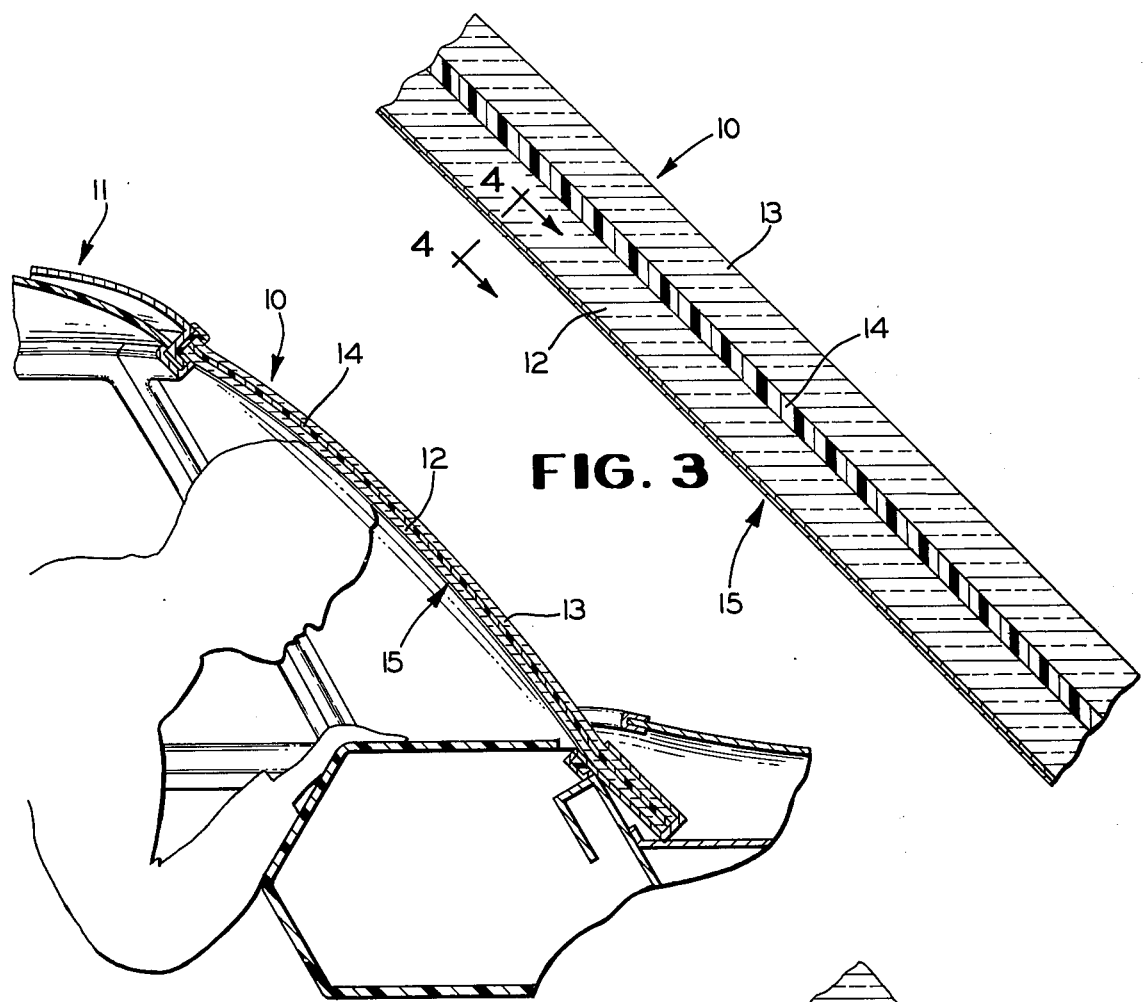
FIG. 2
FIG. 3
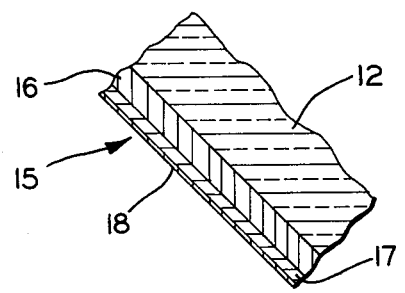
FIG. 4

AUTOMOTIVE GLAZING STRUCTURE

This application is a continuation in part of application Ser. No. 284,137, filed Aug. 28, 1972 and now abandoned.

BACKGROUND OF THE INVENTION

1. Field of the Invention

The present invention relates broadly to automotive windscreens. More particularly it has to do with improved structures of this general character that are usable either as windows or windshields and that exhibit unusual safety properties, especially in affording protection against lacerative injuries, even in high speed collisions.

2. Description of the Prior Art

In the early stages of the automobile industry, single sheets of ordinary glass were employed as windshields. These were followed, as it became evident that the windshield presented a considerable safety hazard, by single sheets of heat treated or tempered glass, which are still used in some foreign countries. Thereafter, as laminated safety glass was developed, it began to be widely employed for automotive glazing until, ultimately, its contribution as a safety feature became so well recognized that its use became universal in the windshields of automobiles driven anywhere in the United States.

Also, prior to 1966, laminated automobile windshield structures had become pretty well standardized in this country as consisting of two sheets of ⅛ inch thick plate or sheet glass bonded together with a 0.015 inch thick plastic interlayer.

However, it was determined that, although adding materially to the cost, thicker plastic interlayers that had their adhesion to the glass controlled as disclosed in U.S. Pat. No. 3,231,461 to provide optimum penetration resistance, were desirable for increased safety; and, thereafter, 0.030 inch thick interlayers of this character were employed with the standard ⅛ inch thick glass sheets to provide the HPR (high penetration resistant) laminated windshields that became a new standard for the industry.

Nevertheless, even when glazed with the high quality laminated glass that is presently in use, automobile windshields continue to present an ever-present hazard to drivers and front seat passengers, in terms of possible penetration and lacerative injuries, even at relatively low impact and car speeds.

Consequently, with the ever growing recognition of the necessity for increased safety precautions, continuing efforts have been and are still being made to appreciably reduce the injury producing potential of automobile windshields.

SUMMARY OF THE INVENTION

The present invention is based on the discovery that the safety factor of any of the currently used or previously known window or windshield structures can be notably improved by incorporating into them a special type of what may be termed a protective, laceration inhibiting covering on and over their inboard glass surface.

Consequently, in an extremely simple form, the invention can be embodied in a glazing structure that involves only one sheet of glass, by applying a laceration inhibiting cover of the character contemplated by the invention to its inboard surface. However, additional advantages can be obtained in more sophisticated forms of the invention, where the basic glazing units include particular configurations of laminated safety glass, by bonding special forms of the protective covering of the invention to the board glass surface of such units.

In any event, it is a primary object of the invention to provide a windshield that is dimensionally and optically similar to commercially acceptable standard windshields, but that will appreciably reduce the number and severity of lacerative injuries to persons thrown against the windshield under all impact conditions.

Another object is to provide such a windshield that exhibits improved ability to decelerate movement of a person thrown thereagainst, without exceeding tolerable deceleration limits, and to increase penetration resistance, at both low and high temperatures.

Still another object is to reduce the amount of flying glass, and of resultant and personal injury to car occupants, from collisions with birds or from objects that may be thrown against the windshields or windows from overpasses or elsewhere outside the vehicle.

Now simply providing a protective covering incorporated into a standard windshield may enable the windshield to meet the above aims. But this is not enough, because there are a considerable number of other equally important, and generally conflicting requirements that must also be met.

For example, even a one or two mils thick layer of practically any plastic material, secured to the inside surface of a conventional windshield with practically any adhesive, will give some protection from lacerative injuries to occupants of the automobile that may be thrown against the windshield. However many plastic sheetings have surfaces that are quite easily and adversely affected by atmospheric conditions and, with a protective covering of such a material, vision through a windshield could become obscure even after a few weeks exposure to the weather.

Similarly, while there are any number of adhesives that will secure plastic to glass, most of them also create serious optical problems if employed in a windshield.

Another problem is that even otherwise acceptable plastic sheets may be susceptible to "denting" or "marking" with a fingernail, pencil or other relatively sharp or pointed implement; and that the resulting indentations may remain more or less permanently. A solution to this, as well as to other marring problems resulting from normal wear and possible abuse, involves not only discovering the right plastic, but also employing it in a thickness that will give enough "body" to minimize marking.

Still another, and extremely important requirement is to provide a laminated structure that includes an adequate protective covering layer of plastic and yet is capable of surviving the required so-called "cold-test".

This test is an accepted procedure for determining the thermo-mechanical stability of laminated structures and involves subjecting the lamination to a temperature of around −65°F. until it comes to equilibrium. During such a test, because of the difference in coefficient of expansion between the glass and plastic, contraction of the plastic sheeting will either rupture the bond between glass and plastic or rip patches off the glass surface of any unit that lacks the necessary stability, even though it is otherwise acceptable.

Good cold temperature performance is attained in the glazing units of the invention by a combination of proper adhesion with controlled thickness and flexibility of the protective covering.

A further problems arises from the necessity of avoiding observable birefringence color under partially polarized light, as from the North Sky, when conventionally produced plastic sheeting is employed in the protective cover lamina. This is a serious problem because most thin plastic sheetings are normally stretched in processing and so, inherently, exhibit a high degree of birefringence color. Moreover, plastic sheetings which are not stretched in processing may have certain areas stretched when they are assembled with the glass, thus giving rise to color fringes in these areas. In a preferred embodiment of the invention this problem is overcome by the use of a plastic in the protective cover that is made by a specially controlled manufacturing process.

Attainment of an acceptable Severity Index presents another very important problem, because the strength of the protective covering affects the Severity Index of the complete structure. Thus, increases in the thickness of the protective covering, such as are required to avoid marking, tend to adversely affect the Severity Index of the complete laminated structure.

The Severity Index is a factor that has become identified with relative safety of the windshields as determined by impact tests using the 50th percentile Alderson dummy covered with two layers of moist chamois on the test sled apparatus; and is calculated by the formula:

$$S.I. = \int A^{2.5} \, t$$

where A is acceleration in units of gravity and $t$ is the time in seconds between the moment of impact of the head of the dummy with the test windshield to the end of the deceleration pulse. The vaue of $A^{2.5}$ is determined for each millisecond during the time interval and the values integrated for the whole time period of the deceleration pulse.

An excellent Severity Index was attained for a preferred embodiment of this invention, by employing a multilayer protective covering of controlled thickness and by correctly orienting or arranging in the lamination and as part of the protective covering a specially drawn plastic sheeting that possesses the ability to tear in one direction and release its resistance to the larger forces of high speed impact. With this sheeting in the protective cover, and at the same speeds, Severity Index figures for the windshield structure of the invention were essentially the same as the Severity Index figures for commercial laminated windshields being currently produced. Moreover, the speed of impact without penetration was significantly higher.

Still another problem is that of attaining acceptable resistance to wear and weathering because, inherently, plastic is quite soft in comparison with glass and so the scratch, abrasion, marking and mar resistance of exposed plastic surfaces generally has been considered unsatisfactory for automotive glazing. However certain surface treatments and wear resistance coatings, to be hereinafter discussed, provide a solution for this and appear, from an extended series of accelerated washing tests, to also provide satisfactory and acceptable interiorly exposed windshield surfaces.

Consequently, it is also an important object of this invention to provide a commercially acceptable automobile windshield or window that has incorporated into its structure a protective cover or shield over its inside glass surface that, in addition to inhibiting lacerative injuries, is not adversely affected by exposure to the atmosphere, is unaffected by extreme cold, is practically color free, does not adversely affect the Severity Index of the structure, and is resistant to marking, scratching, marring and abrasion.

Further objects and advantages will become apparent during the course of the following description, when taken in connection with the accompanying drawings.

BRIEF DESCRIPTION OF THE DRAWINGS

In the drawings, wherein like numerals are employed to designate like parts throughout:

FIG. 1 is a perspective view of the front end of an automobile with a windshield, constructed in accordance with this invention, mounted therein;

FIG. 2 is a diagrammatic, vertical, sectional view, taken substantially along the line 2—2 of FIG. 1, and illustrating the windshield under impact;

FIG. 3 is a fragmentary, vertical sectional view of the windshield of FIGS. 1 and 2 on a somewhat enlarged scale, but also taken generally along the line 2—2 in FIG. 1; and FIG. 4 is a fragmentary view on a further enlarged scale of the structure of FIG. 3, showing the protective covering that is bonded to the inboard glass surface in greater detail.

DESCRIPTION OF PREFERRED EMBODIMENTS

As illustrated in FIG. 1 a windshield 10 of the invention can be mounted in an automobile 11, and will appear therein like an ordinary windshield of standard construction. Moreover, as shown in FIG. 3, it may be made up, again like an ordinary laminated windshield, of two sheets of glass 12 and 13 bonded together, under heat and pressure and in the conventional manner by an interposed layer of plastic 14. Indeed, in a preferred embodiment, the plastic interlayer 14 is a 0.030 inch thick sheet of the high penetration resistant polyvinyl butyral already discussed and that is conventionally used for the purpose in existing currently produced windshields.

However, in this preferred form, the windshield 10 differs importantly from previously accepted standard windshields, first, by the fact that the glass sheets 12 and 13 are preferably sheets of float glass, in thicknesses that may be as low as 0.085 inch but no greater than 0.110 inch, bonded to the relatively low adhesion-high penetrated resistant interlayer 14 with the "bath" surfaces out as described in a U.S. Pat. of H. M. Alexander et al., No. 3,708,386, second, by the provision of a protective laceration inhibiting cover 15 bonded to the inboard surface of the inboard sheet of glass 12; and, third, by the fact that this windshield combines a remarkably greater ability to protect occupants of an automobile in which it is installed from head injuries, particularly to the lacerative type, with notably greater resistance to impact damage to the windshield itself.

As indicated above, a protective interior cover as contemplated by this invention can be effectively employed with a variety of basic windshields and, indeed, of other automotive glazing structures which may be of either the single or multiple sheet type. Also the glass of the structures may be in layers of thicknesses that vary anywhere from approximately 0.040 inch up to ⅛ inch and beyond; and the plastic interlayer thicknesses may vary between 0.015 inch and 0.060 inch. For this reason it may be necessary or desirable to vary the thickness, composition or general make-up of the protective plastic covering employed in order to adapt it to or fit it into the character of the basic laminated structure to which it is to be applied.

However, a major consideration is that the protective covering or shield provide an interior or body portion that does not retract from nor adversely affect the basic windshield structure, that exhbits acceptable optical properties, is capable of acting to decelerate and resist penetration by a human head or other object thrown against it while, at the same time, presenting an exposed surface capable of effectively withstanding atmospheric exposure and the wear to which the inside of a windshield is subjected during normal use.

Consequently, while the protective plastic covering of the invention can be a single layer structure, or a more or less complicated multi-layer one in its sophisticated embodiments, a protective covering that is suitable for use with one form of basic glazing structure will generally also be usable with specifically different base structures so long as it is not physically incompatible.

For example, the preferred form of protective covering or shield that is shown in detail in FIG. 4 is especially well adapted for use with the 0.100 inch thick float glass and 0.030 inch plastic interlayer windshield of the inllustrated embodiment, but would also be effective for its primary purpose if used with a single sheet of tempered or other glass, or with a different laminated configuration, as the basic structure.

Specifically, this shield 15 of FIG. 4 comprises an approximately 0.015 inch thick layer 16 of a relatively soft, extensible plastic material such as polyvinyl butyral, adhered to the inboard surface of the inboard sheet of glass; an approximately 8 mil (0.008 inch) thick layer 17 of a more durable plastic such as a polyethylene terephthalate of the character sold by duPont under the trademark "Mylar"; and a 4 micron thick coating or layer 18 of a more abrasion resistant plastic material which may be a combination of polysilicic acid and copolymers of fluorinated monomers with compounds containing hydroxyl groups such as are described in U.S. Pat. No. 3,476,827 and as are sold by duPont under the trade mark "Abcite". More specifically they may be a combination of polysilicic acid and copolymers of fluorinated monomers, with compounds containing primary alcohols (as described in U.S. Pat. No. 3,429,845), or with compounds containing secondary alcohols (as described in U.S. Pat. No. 3,429,846). Other abrasion coating materials suitable for the purpose are described in U.S. Pat. Nos. 3,390,203; 3,514,425; and 3,546,318.

In this particular construction, the layer 16 may be said to function primarily as an adhesive, but it also acts to cushion impact and, because of its elasticity and extensibility, to assist in resisting penetration by the head of a driver or passenger that may be thrown against the windshield.

The layer 17, with its greater durability, functions to protect the softer and less durable layer 16 and can provide a weathering resistant surface. Both of the layers 16 and 17 are non-lacerative, i.e., they will not cut or tear the skin even when an impact occurs that is of sufficient magnitude to penetrate the plastic shield. Finally, the layer 18 presents a surface hard enough to resist wear, weathering and other abuse without itself constituting a lacerative hazard.

As already indicated, the plastic cover 15 of the preferred and illustrated form of finished windshield structure must, of course, have optical properties that are as good as those of the laminated glass portion thereof. This will not be a problem, so far as the plastic layer 16 of the cover is concerned, where that layer is essentially the same as interlayer 14. However, precautions must be taken as to the layer 17 to insure that it exhibits adequate safety characteristics, as well as such important optical properties as high transparency and freedom from objectionable streaks or lines and from observable birefringence color.

The latter defect is particularly objectionable in windshields when viewed through polarized glasses and from the outside under certain conditions of sky lighting. Its presence and that of streaks and lines may be avoided by plastic selection, and the same thing is true of desired strength characteristics. However, it is known that strength can be affected and generally controlled in many plastics by stretching them, and the use of sheets of a plastic that have been stretched in a manner to control its strength and/or other properties is specifically contemplated.

For example, in attempting to meet the requirements of this invention for a plastic sheet that is free from objectionable color, streaks and lines, the duPont company developed a new method of producing their Mylar (polyethylene terephthalate) sheeting which involves either stretching it in one direction only or unbalanced biaxial stretching. This overcame the birefringence color problem in the sheeting, but it also made it a fibrillating film and susceptible to splitting in the direction of greatest stretch. Surprisingly enough however when, in accordance with the present invention, such a unilaterally or unbalanced bilaterally stretched plastic sheeting is employed as the layer 17 and particularly when it is arranged with its major axis of stretch substantially vertical or at right angles to the width or horizontal dimension of the windshield, the splitting or tearing of layer 17 in one direction under high speed impacts, releases its resistance to the larger forces of such impacts and gives notably improved laceration protection.

Adequate adhesion of the polyethylene terephthalate to the layers 16 and 18 can be assured by subjecting it to a surface conditioning treatment which may be carried out electrically or chemically, but is preferably done by direct contact with a gas flame for a length of time sufficient to alter the surface characteristics but not the bulk properties of the material.

The plastic in the layer 17 may be in thicknesses of from ½ to 14 mils and, in lieu of the polyethylene terephthalate, other plastic materials including other terephthalate esters, polyurethanes, cellulose esters, acrylics, and polyvinyl fluorides may be employed.

Whatever the material, however, the matter of the thickness of the protective plastic cover 15 is significant. Thus, as previously indicated, a plastic cover as thin as 0.001 or 0.002 inch will provide some protection from lacerative damage, and a layer 17 of a durable plastic that is no more than 0.0005 to 0.014 inch thick will insure a glass-plastic structure's passing the cold-test because it exerts only a very slight effect on the structure; and this is especially true on the structure, and against the beam strength, of a laminated safety glass windshield.

However, to provide sufficient body to avoid marking, the layer 17 alone of the protective cover should be between about 5 and 10 mils thick. At the same time, to insure adequate balance, and a Severity Index within the acceptable range, the combined thickness of the interlayer 14 and the adhesive layer 16 in the windshield 10 should not exceed 0.065 inch, and the combined thicknesses of layers 14, 16 and 17 should not exceed 0.075 inch.

As indicated, the above described embodiments are preferred forms of the shield of this invention. However, so long as a protective plastic covering structure possesses the optical properties, including adequate transparency, clarity, and freedom from observable birefringence or other objectionable color, that are required in automobile windshields; together with the desired physical properties including those of energy absorption, strength and weather and wear resistance; its particular composition and/or physical make-up can be varied considerably. Consequently, an effective shield may incorporate a variety of plastic materials and can be a single or double layer structure as well as a three layer one as in the example illustrated. Similarly, a three or other multi-layer shield may be applied to the glass as individual layers, as a combination of multiple and individually layered sheets, or as a single multiple layered sheet as will be evident from the following specific examples:

EXAMPLE I

A windshield 10 as shown in FIGS. 3 and 4 was produced by first assembling two 0.100 inch thick sheets of float glass 12 and 13, that had previously been bent to the desired contour with an interposed 0.030 inch thick sheet 14 of properly plasticized, relatively low adhesion, polyvinyl butyral as described in U.S. Pat. No. 3,708,386. Next, applying to the sheet 12 a 0.015 inch thick sheet of plasticized, relatively high adhesion, polyvinyl butyral 16, and an 8 mils thick sheet 17 of polyethylene terephthalate precoated with a 4 micron thick layer 18 of a mixture of polysilicic acid and copolymers of fluorinated monomers with compounds containing primary alcohol groups such as described in U.S. Pat. No. 3,429,845. A cover sheet of bent glass was then placed over the applied sheets 16 and 17 after which the layers 12, 14, 13, 16 and 17 were bonded together into a unitary structure by subjecting the complete assembly as described above to a pressure of 275 pounds per square inch at a temperature of 300° F. for 10 minutes. The glass cover sheet was then removed, leaving the finished windshield.

The precoated sheet 17 employed in this example was obtained from E. I. duPont de Nemours & Company, Incorporated and said by them to be polyethylene terephthalate film stretched in a special manufacturing process to render it substantially free of observable color fringes upon viewing in partially polarized light and provided with an abrasion resistant coating of the material available under their trademark "Abcite" on one surface.

However, it was noted that the sheet had a tendency to split rather readily under impact along what was understood to be its axis of major stretch and, in accordance with the present invention the sheet 17 was assembled in this example with its major axis of orientation or stretch at substantially right angles to what was to become the width or longitudinal dimension of the windshield.

Windshield structures produced in accordance with Example I successfully passed all of the established tests for commercially acceptable automobile windshields and, in addition, provided laceration protection at impact speeds of 40 and 45 miles per hour.

One of the factors in obtaining these results was the combination of the so-called low-adhesion interlayer 14 of the safety glass, with the high-adhesion (plastic to glass) sheet 16 of the protective covering, in the windshield structure. In this connection, the advantages of a relatively low adhesion interlayer in conventional laminated glass is known, but it is the combination of this with the relatively higher, "tight" adhesion of the laceration shield to the glass that is important here, not only in the structure of Example I, but in other specifically different ones, and the controlling of adhesion in polyvinyl butyral sheets to provide relatively low adhesion-high penetration resistant or relatively high adhesion interlayers is described in U.S. Pat. Nos. 3,231,461; 3,361,699; and 3,468,749.

EXAMPLE II

A windshield produced in the same way as in Example I, except that the layer 18 is a mixture of polysilicic acid and copolymers of fluorinated monomers with compounds containing secondary alcohol groups such as described in U.S. Pat. No. 3,429,846.

EXAMPLE III

An identical windshield was produced in the same way as in Example I except that the layers 16, 17 and 18 of the protective cover 15 were applied to the glass sheet 12 as a single, three layer, composite sheet made up by first producing a polyethylene terephthalate film from a polymer free of particulate additives having an intrinsic viscosity of 0.60–0.62 wherein molten polymer was extruded and doctored onto a cool casting wheel to form an amorphous film using the method and apparatus as described in U.S. Pat. No. 2,754,544 to Bicher. The extrusion temperature at the casting die was 275°C. and the extrusion rate was 550 lbs./hr. at 29.3 ft./min. The casting wheel coolant temperature was 33°C. and the casting hopper or die was mounted top dead center in relationship to the casting wheel. A calender roll was mounted at 45° (in the direction of rotation) from the die in intimate contact with the cast sheet. Air impingement cooling plenums were circumferentially mounted around the casting wheel between the calender roll and a stripper roll which was positioned at 300° (in the direction of rotation) from the hopper. The film was not stretched in a machine direction (MD) and was stretched 3.55 times in a transverse machine direction (TD) in a tenter frame. In the tenter frame the film temperature leaving the preheated zone was 80°C., the stretching temperature was 85°C. and the air temperature was 95°C. After stretching the film was heat set to a density of 1.3753 gms./cc. The cooling section temperature was 65°C. with 1,000 ft./min. air velocity. The film produced was 9 mils thick, and its properties are shown in the Table below. This film, with its surfaces properly conditioned by contact with a flame, was then coated on one surface with an Abcite abrasion-resistant coating comprising (1) a fluorocarbon containing copolymer, and (2) polysilicic acid (73 parts of the copolymer of 50% by weight of tetrafluoroethylene and 50% by weight of hydroxybutyl vinyl ether and 27 parts of the polysilicic acid). The coated film was cured at 135°C. for 16–24 hours and then laminated to a 15-mil ply of polyvinyl butyral to form the three-ply composite sheet.

Examples IIIA and IIIB

Windshields produced in the same way as in Example III, except that, in producing the polyethylene terephthalate film the casting wheel coolant temperature was 34°C.; the stripper roll was positioned at 300°, in the direction of rotation, from the hopper; the film temperature leaving the preheating zone was 81.5°C.; the stretching section air temperature was 99°C.; the film, after stretching, was heat set at a temperature of 144°C.; and the cooling section temperature was 46°C. with 500 ft./min. air velocity. The film so produced was 8.5 mils thick, from two different rolls it was designated A and B. It was substantially free of optical distortion and had no gauge deviation greater than 1% per inch along its surface. A sample of the A and one of the B designated film, with their surfaces conditioned and coated, were laminated to provide the three-ply composite sheets for these examples.

TABLE

| Property | | Ex. III | Ex. IIIA | Ex. IIIB |
| --- | --- | --- | --- | --- |
| Nominal Thickness (mils) | | 9.0 | 8.5 | 8.5 |
| Modulus (Kpsi) | MD | 264 | 260 | 302 |
| | TD | 548 | 560 | 570 |
| Tensile Strength (Kpsi) | MD | 10.1 | 11.5 | 11.6 |
| | TD | 38.1 | 37.8 | 36.0 |
| % Elongation | MD | 6.0 | 9.0 | 7.0 |
| | TD | 122. | 139. | 133. |
| $F_5$ (Kpsi) | MD | 9.4 | 9.6 | 10.3 |
| | TD | 15.9 | 14.4 | 15.3 |
| Density (g./cc.) | | 1.3753 | 1.3777 | 1.3737 |
| Haze % | Total | 2.3 | 0.4 | 1.5 |
| | Internal | 0.6 | 0.1 | 0.7 |
| | Surface | 1.7 | 0.3 | 0.8 |
| Birefringence | | .1016 | .1000 | .0971 |
| Retardation (mu) | | 22200 | 21590 | 21940 |
| Pneumatic Impact (kg.-cm) (115 m./sec. ball) | | 6.6 | 6.5 | 6.3 |

EXAMPLE IV

A windshield 10 as shown in FIGS. 3 and 4 was produced in the same way as in Example I, except that the sheet 16 applied to the sheet 12 was a 0.005 inch thick elastic sheet or film of aliphatic polyurethane (specifically B. F. Goodrich's "Tuftane 600"), and the sheet 17 was a 5 mils thick sheet of cellulose triacetate precoated with a 0.5 mil thick coating of a hydrolysis and condensation product of methyltriethoxy silane to provide the layer 18.

EXAMPLE V

Another windshield as shown in FIGS. 3 and 4 was produced in the same way as in Example I, except that the sheet 16 applied to the sheet 12 was a 0.005 inch thick sheet of ionomer resin (specifically duPont's "surlyn"), which is a class of polymers in which ionized carboxyl groups create ionic crosslinks in the intermolecular structure; and the sheet 17, that was precoated with the 4 micron thick layer 18, was a 5 mils thick sheet of fluorinated ethylene-propylene.

EXAMPLE VI

Another windshield as shown in FIGS. 3 and 4 was produced as in Example I, except that the glass sheet 12 was only 0.065 inch thick, the polyvinyl butyral sheet 16 was only 0.005 inch in thickness, and the precoated sheet 17 was a 2 mils thick sheet of polyvinyl fluoride (specifically duPont's "Tedlar" film).

EXAMPLE VII

Another windshield such as shown in FIGS. 3 and 4 was produced as in Example I, except that the sheet 16 applied to the sheet 12 was a 0.005 inch thick sheet of plasticized polyvinyl chloride, and the sheet 17 precoated with the layer 18 was a 3 mils thick sheet of an acrylic such as "Korad C" made by Rohm & Haas and which is 45% ethyl acrylate and 55% methyl methacrylate.

EXAMPLE VIII

Another windshield such as shown in FIGS. 3 and 4 was produced as in Example I, except that a 0.002 inch thick sheet of an ionomer resin such as discussed in Example V was substituted for the 0.015 inch thick sheet of plasticized, high adhesion, polyvinyl butyral at 16.

EXAMPLE IX

Another windshield somewhat different from that illustrated in FIGS. 3 and 4 was produced in substantially the same way as in Example I, except that the sheet 16 applied to the sheet 12 was a 0.015 inch thick sheet of flexible (elastic) polyurethane such as described in Example IV and, since this layer 16 exhibited a satisfactorily weathering and abrasion resistant surface, the precoated sheet 17 was omitted, and the laminating procedure carried out without it after applying a release wax as a parting material to the contact surface of the glass cover sheet.

EXAMPLE X

Still another windshield was produced by assembling a ⅛ inch thick sheet of glass, that had previously been bent to the desired contour, with a 0.030 inch thick sheet of elastic polyurethane. Then applying to the exposed surface of the polyurethane sheet a 3 mils thick sheet of acrylic such as described in Example VII and that was precoated with a 4 micron thick layer of a mixture of polysilicic acid and copolymers of fluorinated monomers with compounds containing secondary alcohol groups. A cover sheet of bent glass was then placed over the applied precoated sheet and the several layers bonded together as described in Example I.

EXAMPLE XI

Another structure, generally similar to that of Example X was prepared in the same way except that the glass sheet was a 0.100 inch thick sheet of heat strengthened (semi-tempered) glass, a 0.045 inch thick sheet of polyvinyl butyral was substituted for the sheet of polyurethane, and a 7 mils thick sheet of polyethylene terephthalate that had been precoated in the same way was substituted for the precoated acrylic sheet.

As was the case with Example I, structures produced in accordance with Examples II through XI successfully passed the established tests for commercially acceptable automobile windshields, and to provide laceration protection at impact speeds of 40 to 45 miles per hour.

Obviously the thicknesses of the individual layers in the protective plastic shields of the above examples as well as the over-all shield thickness, can be varied to meet not only the particular optical and physical requirements already discussed, but automotive specifications as well. Nevertheless, it was found that they should not, ordinarily, fall outside of a range of from approximately 0.0005 to 0.125 inch.

Accordingly, while the forms of the invention herein shown and described are to be taken as preferred embodiments of the same, it is to be understood that various changes in the size, shape, and arrangement of parts, as well as various procedural changes, may be resorted to without departing from the spirit of the invention as defined in the following claims.

We claim:

1. A transparent, temperature stable glazing structure for automotive vehicles that is free of apparent distortion and birefringence color and comprises the combination; with a sheet of glass that is to become the inboard glass sheet when said glazing structure is mounted and that has a second sheet of glass heat and pressure laminated to a surface thereof with an interposed layer of controlled relatively low adhesion-high penetration resistant plastic; of a relatively soft and extensible but penetration resistant protective plastic cover that includes a layer of relatively high adhesion plastic selected from the group consisting of polyvinyl butyral, ionomer resin, polyurethane and polyvinyl chloride heat and pressure laminated to the surface of said inboard glass sheet that is to become the inboard glass surface of said glazing structure, a more durable sheet of stretched plastic selected from the group consisting of polyethylene terephthalate, polyurethane, cellulose triacetate, fluorinated copolymers of ethylene and propylene, copolymers of acrylic acid esters, and polyvinyl fluoride having a thickness of 0.5 mil to 14 mils arranged with its major axis of stretch at right angles to the horizontal dimension of said glazing structure on said relatively high adhesion plastic layer, and a relatively harder abrasion resistant coating selected from the group consisting of (a) mixtures of polysilicic acid and copolymers of fluorinated monomers with compounds containing alcohol groups, and (b) hydrolysis and condensation products of methytriethoxy silane on the exposed surface of said more durable sheet of stretched plastic, the combined thickness of said interposed layer of relatively low adhesion plastic and said relatively high adhesion plastic layer not exceeding 0.065 inch, and the combined thickness of said plastic sheet and said layers not exceeding 0.075 inch.

2. A glazing structure as defined in claim 1, in which the thickness of said more durable sheet of stretched plastic is between approximately 5 and 10 mils.

3. A glazing structure as defined in claim 1, in which said interposed layer of relatively low adhesion plastic and said relatively high adhesion plastic layer are comprised of polyvinyl butyral, said more durable sheet of stretched plastic is a sheet of polyethylene terephthalate that exhibits a tendency to split in the direction of its major axis of stretch, and said harder coating is a mixture of polysilicic acid and copolymers of fluorinated monomers with compounds containing alcohol groups.

4. A glazing structure as defined in claim 3, in which said harder coating is a mixture of polysilicic acid and copolymers of fluorinated monomers with compounds containing primary alcohol groups.

5. A glazing structure as defined in claim 3, in which said harder coating is a mixture of polysilicic acid and copolymers of fluorinated monomers with compounds containing secondary alcohol groups.

6. A glazing structure as defined in claim 1, in which said glass sheets are approximately 0.100 inch thick sheets of float glass, said interposed layer of relatively low adhesion plastic is an approximately 0.030 inch thick sheet of plasticized polyvinyl butyral, said relatively high adhesion plastic layer is an approximately 0.015 inch thick sheet of plasticized polyvinyl butyral, said more durable sheet of stretched plastic is an approximately 8 mil thick sheet of polyethylene terephthalate, and said harder coating is an approximately 4 micron thick precoating of a mixture of polysilicic acid and copolymers of fluorinated monomers with compounds containing alcohol groups on said sheet of polyethylene terephthalate.

7. A glazing structure as defined in claim 6, in which said precoating is a mixture of polysilicic acid and copolymers of fluorinated monomers with compounds containing primary alcohol groups.

8. A glazing structure as defined in claim 6, in which said precoating is a mixture of polysilicic acid and copolymers of fluorinated monomers with compounds containing secondary alcohol groups.

9. A glazing structure as defined in claim 1, in which said sheet of stretched plastic comprises a frangible, asymmetrically oriented, dimensionally stabilized and optically transparent film structure of polyethylene terephthalate having an optical retardation of at least 5,000 millimicrons and a gauge deviation of less than 1% per inch along its surface.

10. A glazing structure as defined in claim 9, in which said polyethylene terephthalate film structure has an intrinsic viscosity of between 0.40 and 0.70 and a density of between 1.360 and 1.400.

* * * * *

UNITED STATES PATENT OFFICE
CERTIFICATE OF CORRECTION

PATENT NO. : 3,900,673
DATED : August 19, 1975
INVENTOR(S) : Paul T. Mattimoe et al It is certified that error appears in the above-identified patent and that said Letters Patent are hereby corrected as shown below:

```
Col. 2, line  5, "board" should be --inboard--
        line 45, "sheets" should be --sheetings--
Col. 3, line  5, "problems" should be --problem--
Col. 4, line 54, "penetrated" should be --penetration--
Col. 5, line 12, "retract" should be --detract--
        line 13, "exhbits" should be --exhibits--
        line 32, "inllustrated" should be --illustrated--
Col. 8, line 59, "preheated" should be --preheating--
```

Signed and Sealed this eleventh Day of November 1975

[SEAL]

Attest:

RUTH C. MASON
Attesting Officer

C. MARSHALL DANN
Commissioner of Patents and Trademarks